United States Patent [19]

Meeker

[11] 4,397,630

[45] Aug. 9, 1983

[54] APPARATUS FOR LOADING AND INJECTION UNIT OF AN INJECTION MOLDING MACHINE

[75] Inventor: Gregory W. Meeker, Webster, N.Y.

[73] Assignee: USM Corporation, Farmington, Conn.

[21] Appl. No.: 255,862

[22] Filed: Apr. 20, 1981

[51] Int. Cl.$^3$ .............................................. B29F 1/00
[52] U.S. Cl. .................................. 425/582; 222/144.5; 222/145; 222/389; 425/586
[58] Field of Search ............................... 425/257–260, 425/578, 580–587; 222/144.5, 145, 389

[56] References Cited

U.S. PATENT DOCUMENTS

| | | | |
|---|---|---|---|
| 1,890,802 | 12/1932 | Apple | 425/585 X |
| 2,243,968 | 6/1941 | Lester | 425/586 X |
| 2,658,237 | 11/1953 | Cuppett | 425/586 |
| 3,492,699 | 2/1970 | Hendry | 425/257 |

Primary Examiner—Thomas P. Pavelko
Attorney, Agent, or Firm—Vincent A. White

[57] ABSTRACT

An arrangement for loading an injection unit of an injection molding machine by a stuffer apparatus wherein a uniform measure of plastic-like material is consecutively fed to the machine. The arrangement comprises a plurality of container units which are movable from a receiving position under a hopper to a discharge position over the injection unit of the injection molding machine wherein the material is rammed therein. As one of the container units is being emptied into the machine, another container unit may be filled, reducing time between successive loadings and unloadings thereof.

2 Claims, 5 Drawing Figures

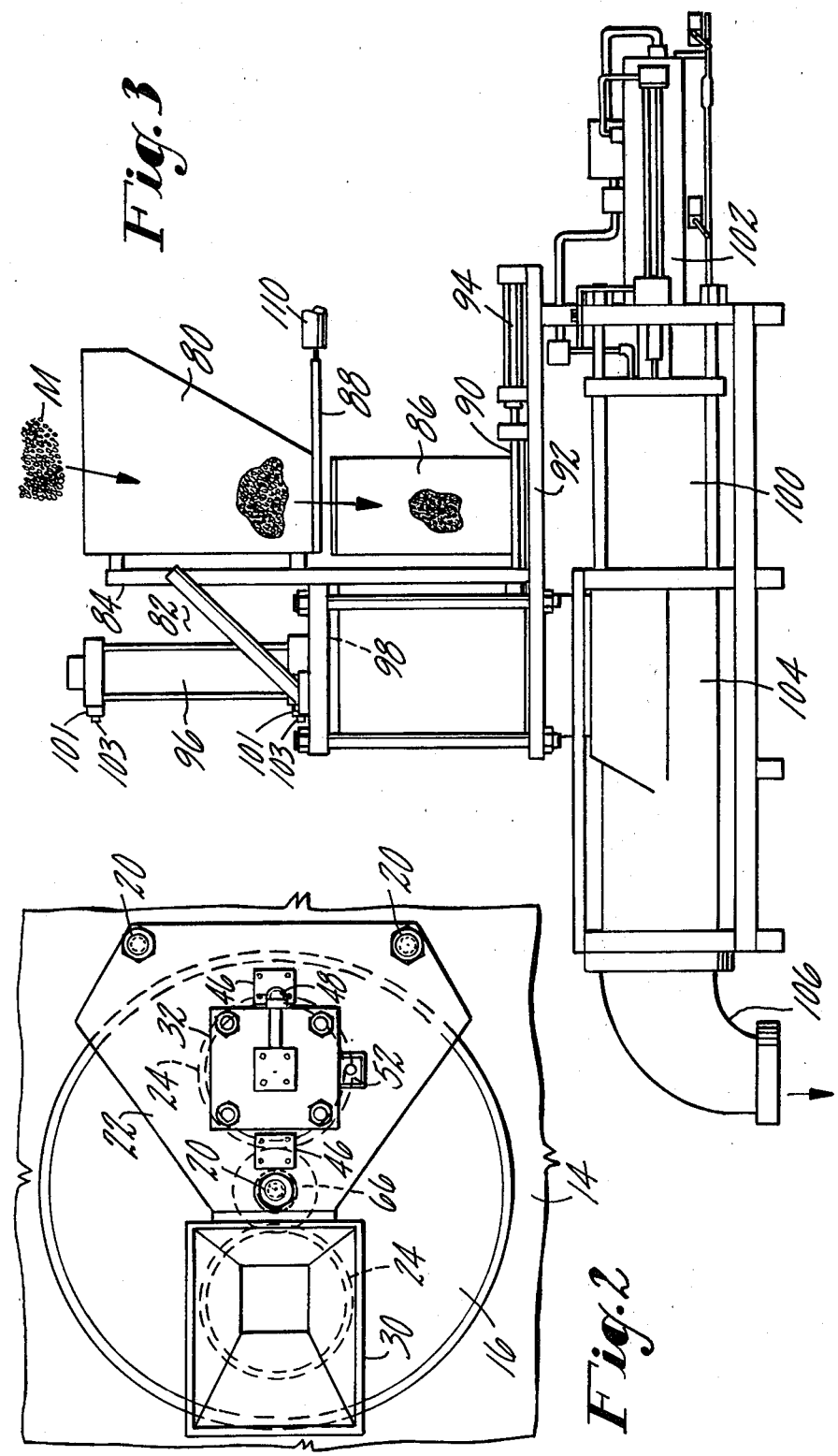

APPARATUS FOR LOADING AND INJECTION UNIT OF AN INJECTION MOLDING MACHINE

BACKGROUND OF THE INVENTION (1) Field of the Invention

This invention relates to injection molding machines, and more particularly to mechanisms for successively loading particular quantities of material into the injection unit of an injection molding machine.

(2) Prior Art

The feeding of plastic-like material in measured quantities to machines for subsequent processing, has taken a number of forms, such as the U.S. Pat. No. 2,383,536 to Elliott, showing a dough dividing machine, where a reciprocating plunger in a measuring chamber is arranged in a hopper, to discharge a slug of dough. The plunger is adjusted by means of a screw which limits its travel distance. The cycle time is limited because the dough must flow into the measuring chamber before the plunger can move to charge it. Another interesting device for molding plastic materials comprises a rotatable turntable having a plurality of openings therein, which passes under a hopper to receive material therein, and rotates to a position to eject an edible cake formed in the opening, for subsequent processing.

U.S. Pat. No. 3,421,220 to Stanga shows an apparatus for forming and molding cheese wherein empty cheese formers ride a turntable and cheese is pushed up into them. The formers rotate to a position where they are unclamped and removed by hand. The rotational aspect is efficient, but hand removal is inefficient.

A further U.S. Pat. No. 4,003,498 to Moneghan discloses an apparatus wherein bulk material is fed to a plasticizing screw from an overhead stuffer hopper by a reciprocating plunger. The screw is operable during injection periods to fill mold halves to make brake shoes and the like. The screw is stoppable during press portions of the cycle, by de-actuation thereof, through complicated electrical circuitry. The prior art also includes U.S. Pat. Nos. 3,979,488 to Greenhalgh et al and 4,168,943 to Abraham which show screw feed mechanisms for continuous screw extruders, the former having a reciprocating screw to assist in the material supply process. The art uncovered discloses these various feed mechanism which are rather elaborate and/or inefficient for accomplishing a consecutive feed operation of measured units of material to an injection molding machine.

It is thus an object of the present invention, to provide an apparatus for overcoming the disadvantages of the prior art.

It is also an object of the present invention to provide an apparatus which will consecutively feed measured amounts of plastic-like material, to an injection molding machine in an efficient and simple manner.

BRIEF SUMMARY OF THE INVENTION

The present invention comprises an apparatus for stuffer-loading the injection unit of an injection molding machine with a measured quantity of material therein. The apparatus preferably includes a turntable mounted on an axis, with a plurality of containers thereon, or a shuttle arrangement which comprises one container which slides between a load and a discharge position. In the preferred embodiment, the containers are open at their upper end, and at one location of the turntable, they may receive a quantity of plastic-like material from a conveyor directly thereabove, or from a hopper arrangement to guide the material into the container. The turntable may then rotate so as to locate the container beneath a plunger and over a transition conduit above the injection unit of an injection molding machine. The plunger also includes a sealing sleeve which fits over the top of the container to secure it and keep the container from slipping during the plunging operation. Once the sealing sleeve is fitted around the upper lip of the container by an arrangement of drive cylinders, the plunger is caused to move into the container, pushing the material therein, through an orifice in the turntable, and into a transition cone above the injection unit of the injection molding machine.

As the injection unit of the injection molding machine is being charged with the measured quantity of material from the container thereabove, another container is simultaneously being filled beneath the hopper arrangement so as to minimize time between successive discharges of filled containers into the transition cone and injection unit of the injection molding machine. The plunger assembly includes limit switches to regulate the motion of the plunger in the cycle thereof, that is, a first switch contactable at one end of the plunge cylinder to stop further advance thereon, and to signal retraction of the plunger into it's housing, and a second switch contactable at the other end of the plunge cylinder to stop further retraction thereof, and to signal its position before the advance of the plunger into a newly filled container therebeneath. An arrangement of drive cylinders are disposed on a platform which supports the plunger cylinder. The drive cylinders reciprocably move the annular sealing sleeve against the upper lip of each container unit just before the plunger is driven therethrough, to secure the container and prevent spillage and plunger misalignment. The sleeve is lifted from the lip of the discharge container just after the retraction of the plunger from the container. The sleeve has a shoulder arranged along its distal edge, to overlap the upper rim of each container, to insure proper sealage and security therebetween. A drive motor is arranged beneath or alongside the periphery of the turntable to effectuate intermittant rotation therein and may be actuated by proper circuit means.

The shuttle arrangement comprises a container which is moved by shuttle means between a load position on a platform and under a conveyor or the like directly above, to a discharge position over an orifice in the platform and over a transition conduit above the injection unit of the injection molding machine. The plunger mechanism drive cylinders and sealing sleeve may be similar in this embodiment, to those described in the preferred embodiment.

BRIEF DESCRIPTION OF THE DRAWINGS

The objects and advantages of the present invention will become more apparent when viewed in conjunction with the following drawings, in which:

FIG. 2 is a view taken along the lines II—II of FIG. 1; and

FIGS. 3, 4 and 5 are sequential elevational views of an alternative embodiment of an injection unit loading apparatus for an injection molding machine.

DESCRIPTION OF THE PREFERRED EMBODIMENT

Figure 1:
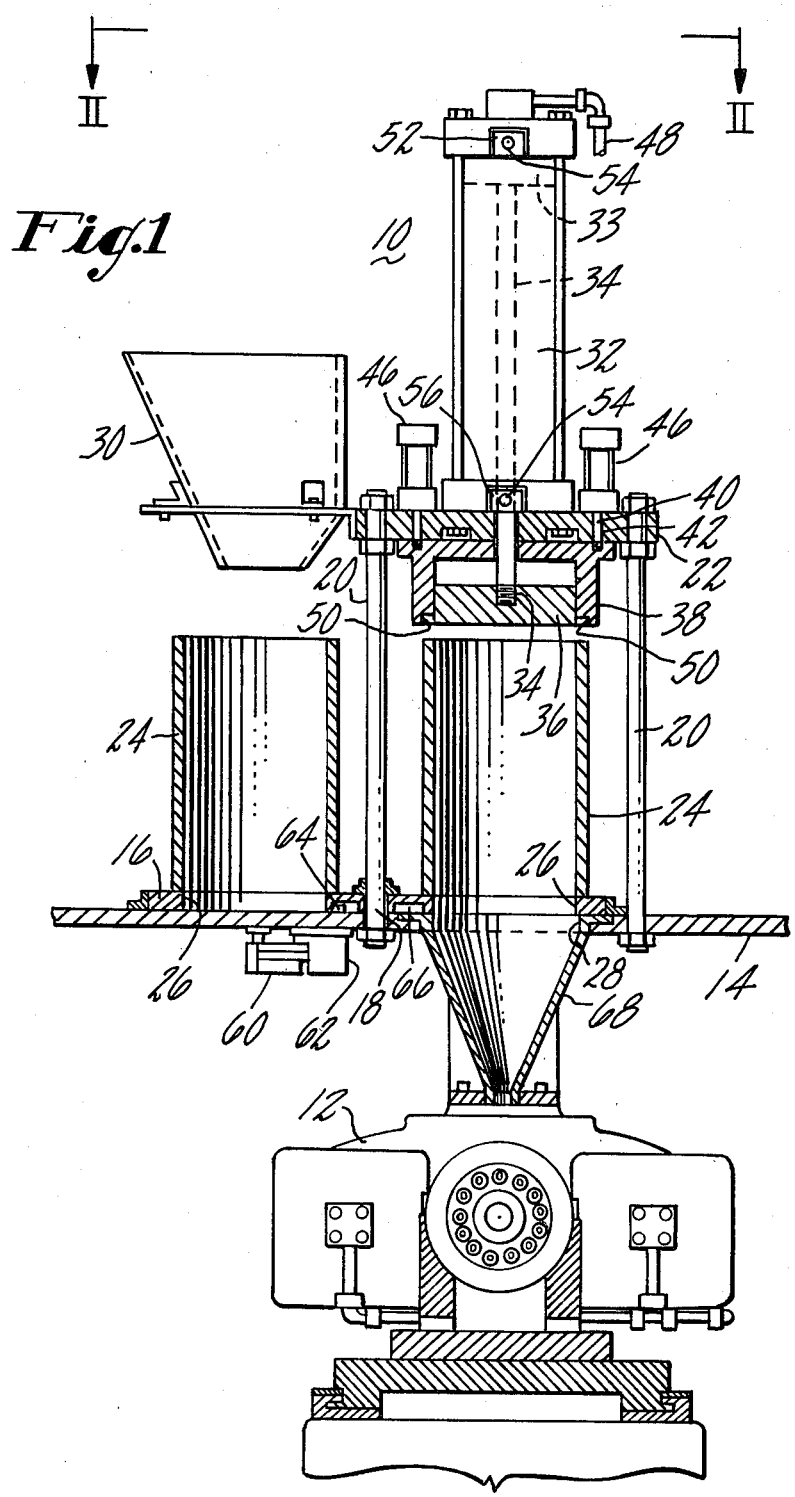
FIG. 1 is a sectional side view of a loading apparatus arranged over an injection molding machine injection unit.

Referring now to the drawings in detail, and particularly to FIG. 1, there is shown a stuffer loader 10, in communication with a molding machine injection unit 12. The stuffer loader 10 comprises a baseplate 14 on which a turntable 16 may rotate about an axis 18. The axis 18 also comprises a tie rod 20 which together with several other tie rods 20 may form a triangular support arrangement for a platform 22.

A plurality of cannisters or containers 24, two in this embodiment, are secured to the turntable 16. Each container 24 is of cylindrical configuration, and is open at each end thereof. The opening in lower end of each container 24 is fixedly aligned with an opening 26 in the turntable 16. The baseplate 14 has an opening 28 aligned with the bottom of the container 24 in its discharge position as seen in FIG. 1. The platform 22 is arranged parallel with the baseplate 14 and may support a divert hopper 30 and a double acting plunge cylinder 32, the divert hopper 30 and the plunge cylinder 32 preferably being 180° apart from one another about the tie rod 20, which comprises the axis 18 thereof, as shown in FIG. 2. The plunge cylinder 32 comprises a piston 33, attached to a connecting rod 34 which is secured to main plunger 36 at its lower end thereof.

An annular sealing sleeve 38 is disposed beneath the platform 22 and is held thereadjacent by a plurality of threaded shafts 40 which each reciprocably slide through a channel 42 in the platform 22 and are each adapted to a drive cylinder 46 mounted on the top side of the platform 22. The drive cylinders 46 are empowered by proper pressurizable means, not shown, to reciprocably move each of the threaded shafts 40. The plunge cylinder 32 is empowered to reciprocably move the main plunger 36, by connection with a pressure source 48, shown only partially. The annular sealing sleeve 38 has a stepped shoulder 50 on its distal edge, the shoulder 50 being arranged so as to overlap the upper edge of each container 24 when the drive cylinders 46 are pressurized to extend their shafts 40. An upper limit switch assembly 52 is arranged adjacent to the plunge cylinder 32 at the top thereof and has a pin mechanism 54 which extends inside the plunge cylinder 32. The pin mechanism 54 is triggered when the piston 33, inside the plunge cylinder 32 is retracted to its upwardmost position. A lower limit switch assembly 56 also has the pin mechanism 54 which extends inside the plunge cylinder 32, and which is triggered by contact when the piston 33 thereinside, is driven to its downwardmost position. The limit switch assemblies 52 and 56 are connected with proper circuitry, not shown, to pressurization means, not shown, for the plunge cylinder 32 to sequentially actuate these devices accordingly.

The turntable 16, may be rotated by a stepping motor 60 arranged beneath the baseplate 14 and may be engaged with a pinion gear 62 or friction wheel that extends through the baseplate 14, and into engagement with a curvilinear surface 64 or arcuate gear disposed at least in part of a circular channel 66 in the bottom of the turntable.

In operation of the preferred embodiment, as may be seen in FIGS. 1 and 2, a desired quantity of material may be dropped into the divert hopper 30. The stepping motor 60 is actuated by signal means to turn the turntable 16, with the containers 24, thereon, about 180° around their axis 18, so that the cylinder 24 which should have a quantity of material therein, is now disposed over the opening 28 in the baseplate 14. A cooled transition cone 68 is disposed on the bottom side of the opening 28 against the baseplate 14, forming a conduit between the opening 26 and an inlet of the injection unit 12 of the injection molding machine. Once the container 24 is properly aligned over the opening 28, a proper signal may cause the drive cylinders 46 to propel their respective shafts 40 downwardly, causing the distal edge of the annular sealing sleeve 38 to be pressed against the upper lip of the container 24 in an overlapping and sealing fashion. Once the container 24 and the sealing sleeve 38 are sealed and secured, a signal from a proper circuit, not shown, may pressurize the plunge cylinder 32 to press the material dropped therein, into the transition cone 68, and into the inlet of the injection unit 12 of the injection molding machine.

Once the inside piston 33, triggers the pin 54 in the lower limiting switch 56, downward motion of the main plunger 36 is stopped and reversed upwardly, and the drive cylinders 46 are actuated to effect an upward pull on the shafts 40 and the sealing sleeve 38, towards the bottom side of the platform 22. Full retraction of the inside piston 33 triggers the upper limit switch 52 to stop motion in the plunge cylinder 32, to permit rotation of the turntable 16 and subsequent emplacement of a freshly filled container 24 of material beneath the main plunger 36 and over the opening 28 as mentioned above, for the cycle to begin anew.

Figure 4:
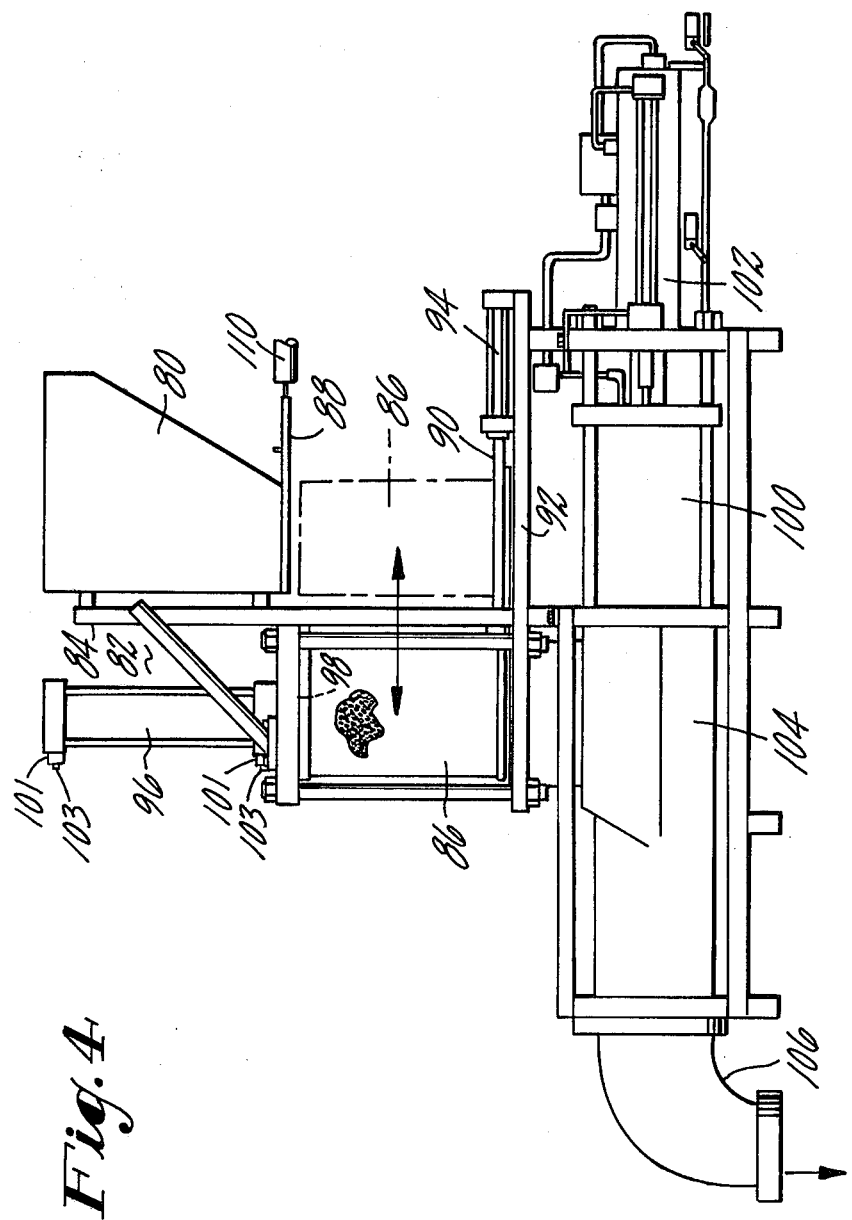
Figure 5:
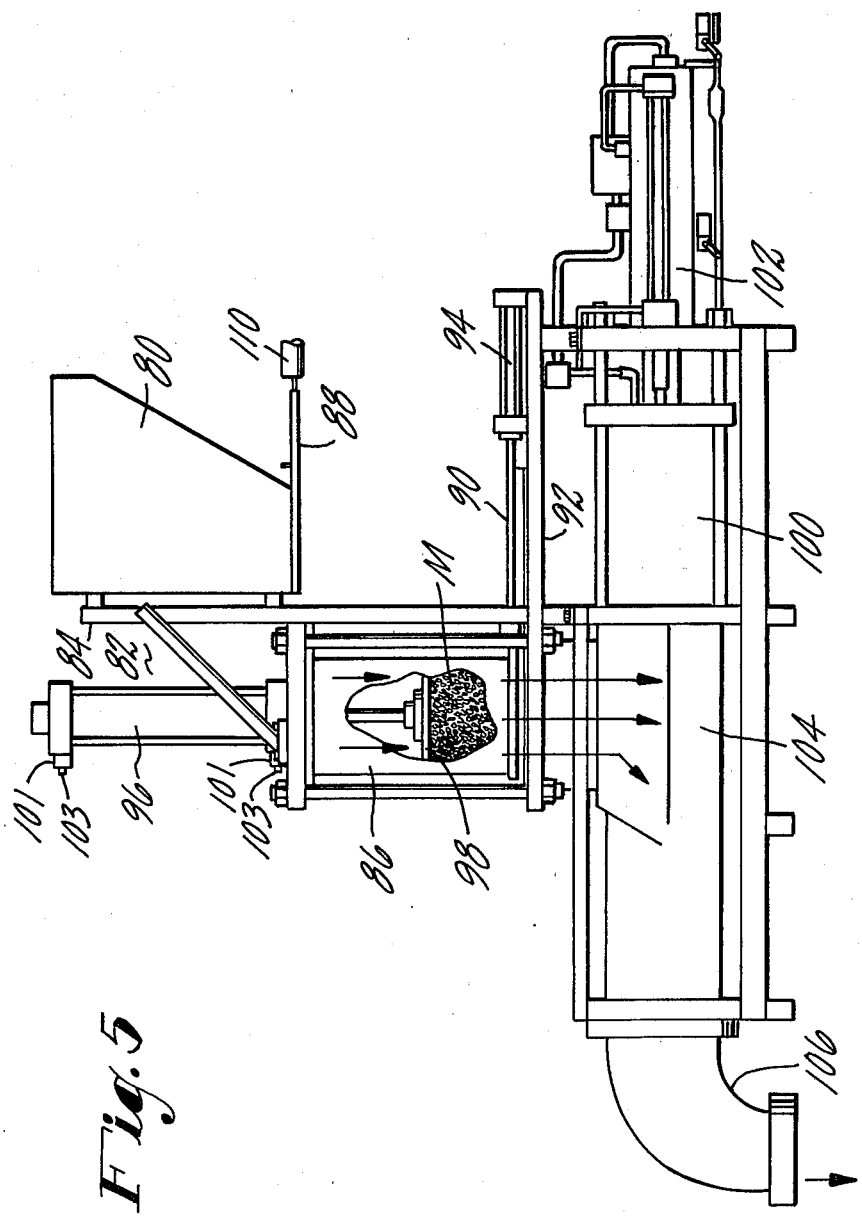

An alternative embodiment of this stuffer loader is shown sequentially in FIGS. 3, 4 and 5, wherein a quantity of material M is loaded into a refill hopper 80 of a reciprocal stuffer loader 82. The refill hopper 80 is secured to a generally vertical disposed frame 84 arranged over a plunge cannister 88. A shut-off slide 88 may be movably held under the refill hopper 80 to automatically slide back and forth to permit a particular quantity of material to fall into the cannister 86. The plunge cannister 86 is disposed on a shuttle track 90. The shuttle track 90 is movably disposed on a bedplate 92, and the shuttle track 90 is attached to pressurizable shuttle cylinder 94, and extends linearly to a position beneath a double-acting plunge cylinder 96 which has a recessed plunger 98 arranged similar to the aforementioned embodiment. The plunge cannister 86 has an open bottom, and the bedplate 92 has an opening therethrough, beneath the plunger 98. A main stuffer unit 100 is disposed beneath the bedplate 92 and has a reciprocable piston and cylinder arrangement 102, empowerable to push a main plunger, not shown, through a body 104 to effect movement of material therein, through a subsequent elbow 106, into an injection unit, not shown, but which may be similar to the injection unit shown in FIG. 1. A quantity of material may be dropped into the refill hopper 80 and then be dropped into the plunge cannister 86, as shown by arrows in FIG. 3. The shut-off slide 88 may shut off the falling of material after a predetermined volume of material had passed thereby, by actuation of a pressurizable cylinder 110, through a proper circuit means, not shown. The cannister 86 as shown in FIG. 4, is then caused to move to a location on the bedplate 92 beneath the plunge cylinder 96 by pressurization of the shuttle cylinder 94, effectuated by the proper circuitry, not shown. The plunger 98, shown in FIG. 5, is actuated to force the material M through the open lower end of the cannister 86, and through the opening in the bedplate 92, into the body 104 of the stuffer unit 100 by signals generated through an arrangement of limit switches 101 and pin mechanisms 103 simlar to those in the aforementioned embodiment. The piston and cylinder arrangement 102 are actuated by the necessary circuitry, to force the material from the body 104, through the elbow 106, and into either the feed throat or injection barrel of an injection unit of an injection molding machine. A further arrangement of the plunge cylinders may comprise a pair of pressurizable cylinders which are connected to and spaced apart on a horizontal brace which supports a shaft therebetween, said shaft connected to a plunge piston, instead of having the pressurizable cylinder on top of the plunge piston, thereby eliminating a portion of the height of the plunge mechanism.

Thus, there has been shown a plurality of material transfer arrangements which permits clean, efficient, measured loading of the injection unit of injection molding machines in a manner which optimizes space utilization and minimizes manual operation.

I claim:

1. A molding material stuffing mechanism for an injection molding machine comprising means for supplying bulk molding material; at least two open-ended containers; means for moving the containers between the supplying means where each container receives a charge of the material and an inlet for the molding machine; and a plunger movable through the container located at the inlet for forcibly ejecting the material from the container into the inlet, the moving means including a plate for closing one end of each container to support material deposited from the supplying means into the container, the plate also having an opening for directing material ejected from the container into the inlet, the containers being carried by a turntable rotatable on the plate between the supplying means and the opening in the plate, the turntable having openings underlying the containers.

2. A mechanism according to claim 1 including means engaging the open end of the container at the inlet for locating and sealing the container prior to movement of the plunger.

* * * * *